(12) United States Patent  
Keller et al.

(10) Patent No.: US 7,131,267 B1  
(45) Date of Patent: Nov. 7, 2006

(54) DUAL NEUTRAL START SWITCHES

(75) Inventors: Scott W. Keller, Charleston, IL (US); Lonnie E. Holder, Sullivan, IL (US); Michael Taylor, Sullivan, IL (US); Thomas P. Gavin, Sullivan, IL (US); Donald G. Cook, Sullivan, IL (US); Michael E. Cook, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 42 days.

(21) Appl. No.: 10/676,937

(22) Filed: Oct. 1, 2003

(51) Int. Cl.  
*F16D 31/02* (2006.01)

(52) U.S. Cl. ........................ 60/399; 180/305

(58) Field of Classification Search .......... 60/399, 60/328; 92/12.2, 5 R; 180/305–308, 271, 180/287; 477/99  
See application file for complete search history.

(56) References Cited

U.S. PATENT DOCUMENTS

| | | | |
|---|---|---|---|
| 3,613,482 A * | 10/1971 | Benson, Jr. et al. ......... 477/99 |
| 3,984,967 A | 10/1976 | Jones | |
| 3,999,643 A | 12/1976 | Jones | |
| 4,271,728 A * | 6/1981 | Wakamatsu ................. 477/34 |
| 4,998,450 A * | 3/1991 | Nogle ......................... 477/99 |
| 5,123,244 A | 6/1992 | Kita et al. | |
| 5,314,038 A | 5/1994 | Peterson | |
| 5,314,387 A | 5/1994 | Hauser et al. | |
| 5,436,419 A | 7/1995 | Welscher et al. | |
| 5,438,831 A | 8/1995 | Okada | |
| 5,586,955 A | 12/1996 | Wanie | |
| 5,601,512 A | 2/1997 | Scag | |
| 5,743,247 A | 4/1998 | Kingsley et al. | |
| 5,994,857 A | 11/1999 | Peterson, Jr. et al. | |
| 6,026,634 A | 2/2000 | Peter et al. | |
| 6,085,502 A | 7/2000 | Wians et al. | |
| 6,105,348 A | 8/2000 | Turk et al. | |
| 6,109,009 A | 8/2000 | Benson | |
| 6,109,010 A | 8/2000 | Heat et al. | |
| 6,122,996 A | 9/2000 | Hauser et al. | |
| 6,301,885 B1 | 10/2001 | Johnson et al. | |
| 6,332,393 B1 | 12/2001 | Trimble | |
| 6,339,916 B1 | 1/2002 | Benson | |
| 6,378,300 B1 | 4/2002 | Johnson et al. | |
| 6,405,513 B1 | 6/2002 | Hancock et al. | |
| 6,487,857 B1 | 12/2002 | Poplawski et al. | |
| 6,539,713 B1 | 4/2003 | Johnson et al. | |
| 6,568,162 B1 | 5/2003 | Walters | |
| 6,591,594 B1 | 7/2003 | Hancock et al. | |
| 6,609,357 B1 | 8/2003 | Davis et al. | |
| 6,625,963 B1 | 9/2003 | Johnson | |
| 6,755,703 B1 * | 6/2004 | Erickson ...................... 440/75 |
| 6,955,046 B1 * | 10/2005 | Holder et al. ................ 60/487 |
| 2004/0103659 A1 * | 6/2004 | Johnson et al. ............. 60/500 |
| 2005/0044850 A1 * | 3/2005 | Korthals ...................... 60/487 |

OTHER PUBLICATIONS

U.S. Appl. No. 10/653,319.

* cited by examiner

*Primary Examiner*—Meredith C. Petravick  
(74) *Attorney, Agent, or Firm*—Neal, Gerber & Eisenberg LLP

(57) ABSTRACT

Dual neutral start switch configurations for preventing vehicle users from starting or activating a vehicle engine under certain circumstances and designed to be part of the control arm or return-to-neutral configuration are disclosed. These configurations may be used with pumps, transmissions or transaxles in a variety of different vehicle applications. Also disclosed is a combination neutral start switch and reverse mower blade cutoff switch.

30 Claims, 13 Drawing Sheets

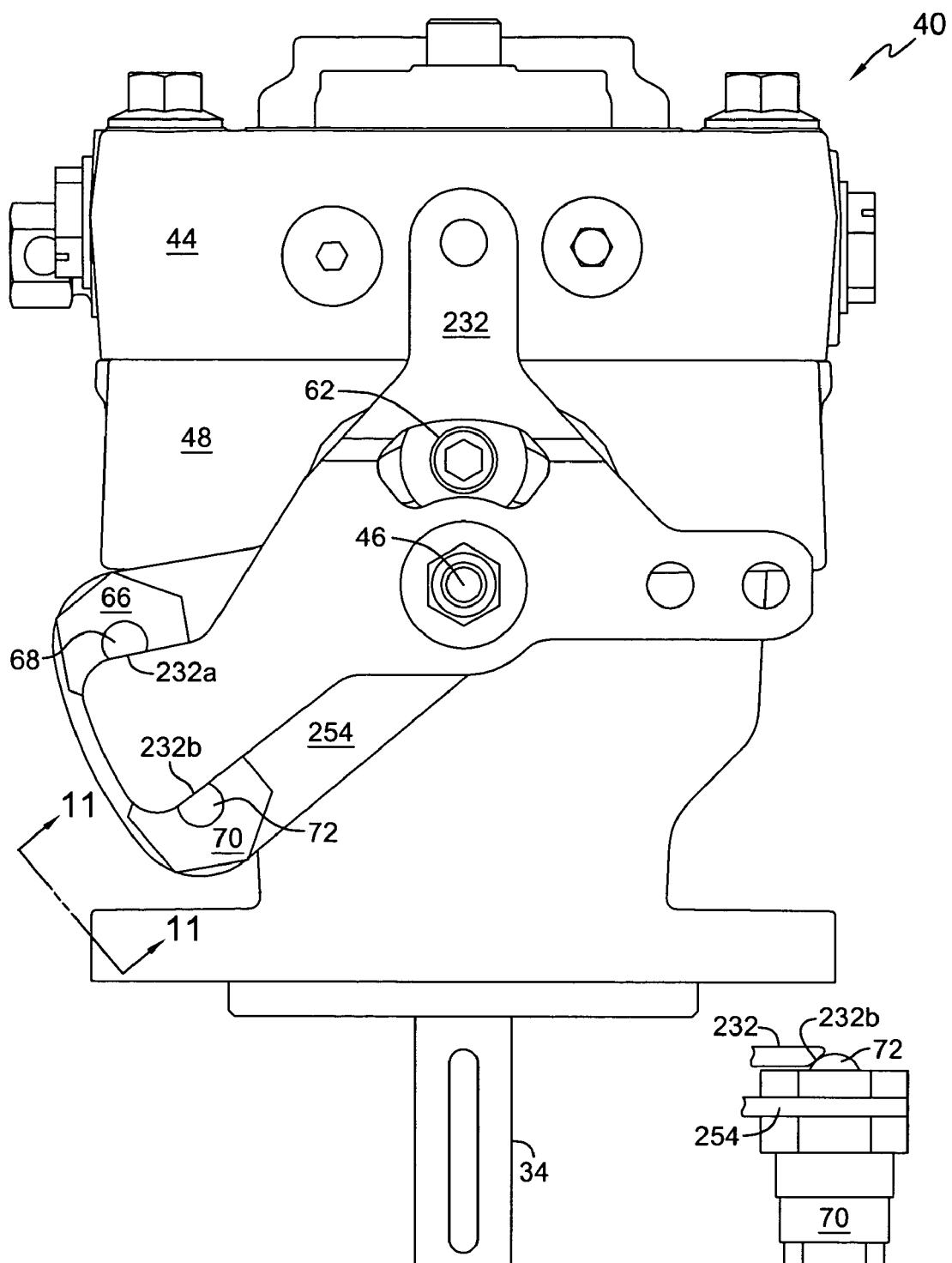
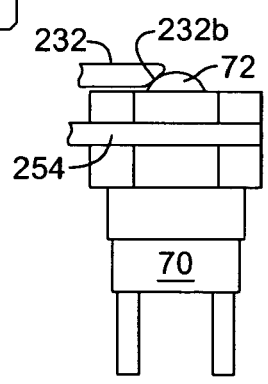
FIG. 10
FIG. 11

US 7,131,267 B1

DUAL NEUTRAL START SWITCHES

BACKGROUND OF THE INVENTION

This invention relates generally to drive devices, and more particularly, to dual neutral start switches for use in connection with a drive device. The neutral start switches may be mounted to a drive device, such as a hydraulic pump, transaxle or transmission, for preventing the vehicle user from starting or activating a vehicle engine, unless one or more drive devices are in the neutral position.

It is well known to provide "neutral start switches" for preventing the vehicle user from starting or activating a vehicle engine, unless one or more drive devices are in the neutral position. Such switches are often placed either on the shifting arm or on the linkage leading to the transaxle controls.

This invention also relates to reverse cutoff switches for deactivating a blade clutch or shutting off a vehicle engine when a mower blade is activated and the vehicle moves in reverse.

Hydrostatic transmissions come in a variety of configurations, including parallel pump and motor, dual pump and motor, and configurations where the hydrostatic transmission is incorporated within a housing containing gearing, often known as an integrated hydrostatic transaxle or IHT.

SUMMARY OF THE INVENTION

Dual neutral start switch configurations for preventing vehicle users from starting or activating a vehicle engine under certain circumstances and designed to be part of the control arm or return-to-neutral configuration are disclosed. These configurations may be used with pumps, transmissions or transaxles in a variety of different vehicle applications. Also disclosed is combination neutral start switch and reverse mower blade cutoff switch.

Other benefits and objects of this invention are disclosed herein and will be obvious to readers of ordinary skill in the art. The features disclosed herein can be combined to create a unique design; it should be understood, however, that such features are unique in their own right and can be used independently with other transmission, transaxle or vehicle designs, as will be obvious to one of ordinary skill in the art.

BRIEF DESCRIPTION OF THE DRAWINGS

FIG. 10 depicts an elevational view of a third embodiment of the present invention in a neutral position incorporated in a hydraulic pump.

FIG. 11 depicts a partial view of the embodiment shown in FIG. 10 along lines 11—11.

DETAILED DESCRIPTION OF THE DRAWINGS

Figure 1:
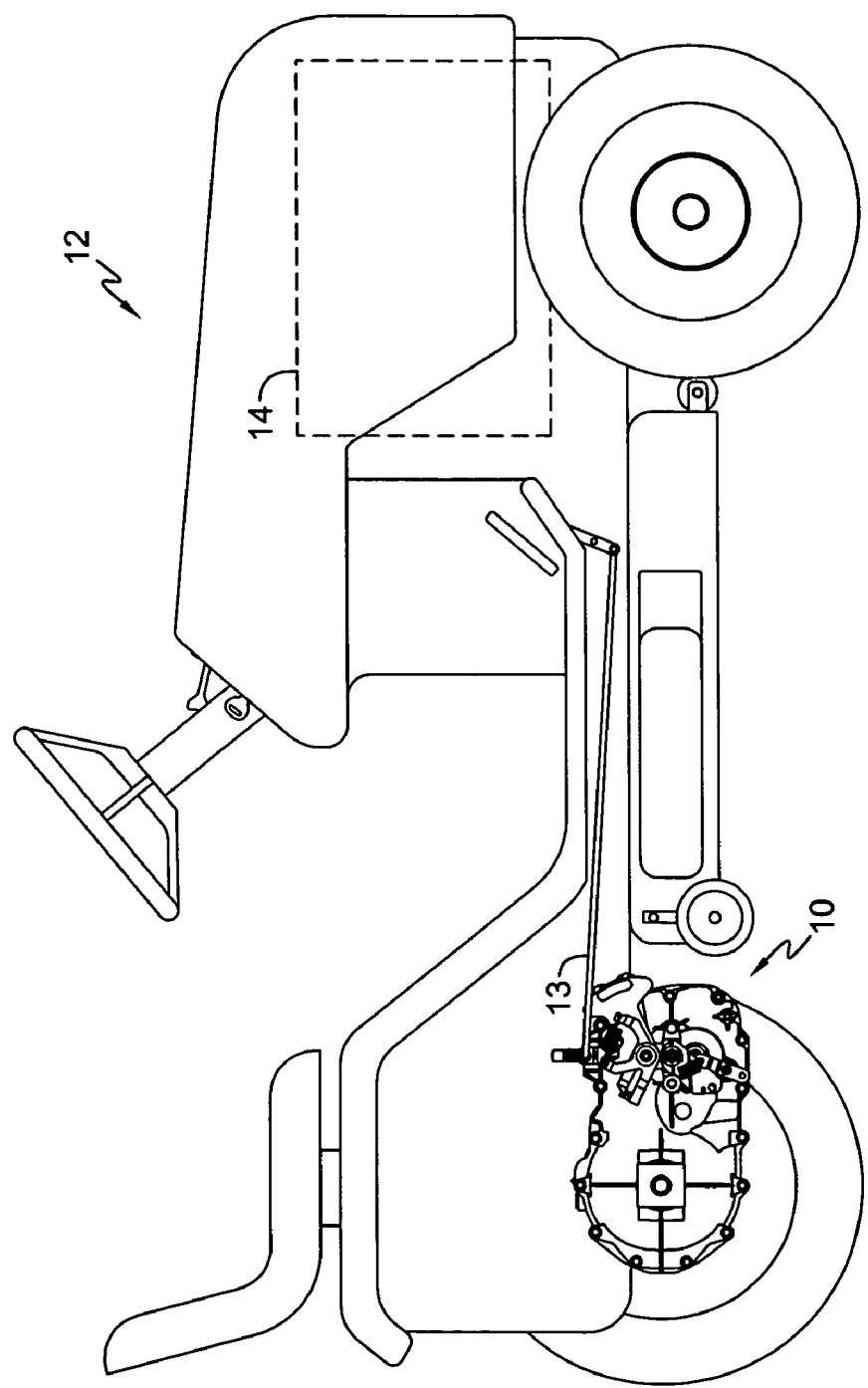
FIG. 1 depicts a side elevational view of a vehicle including a hydrostatic transaxle incorporating the present invention.
Figure 2:
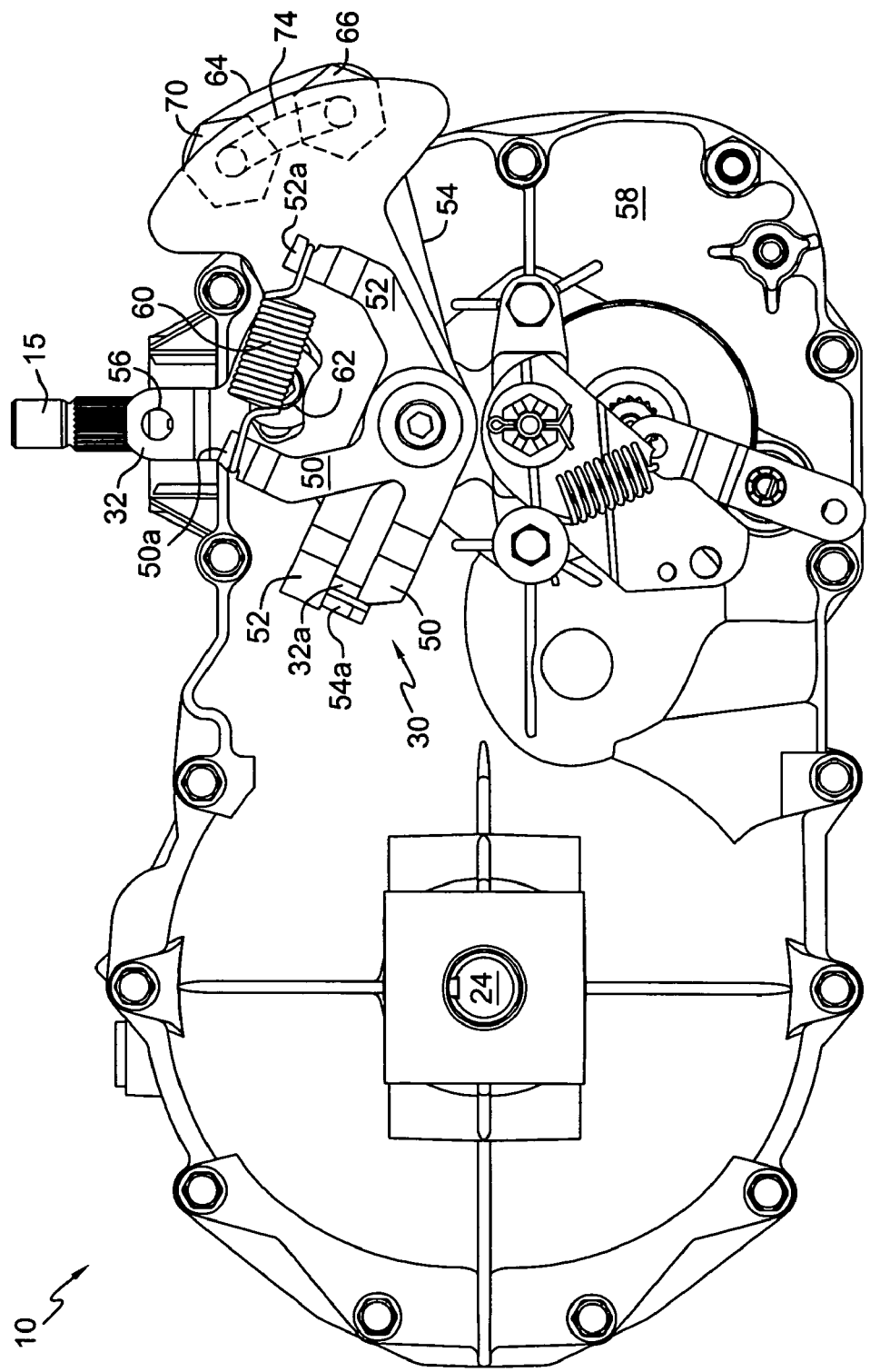
FIG. 2 depicts a side elevational view of the hydrostatic transaxle shown in FIG. 1 with a first embodiment of the invention.
Figure 3:
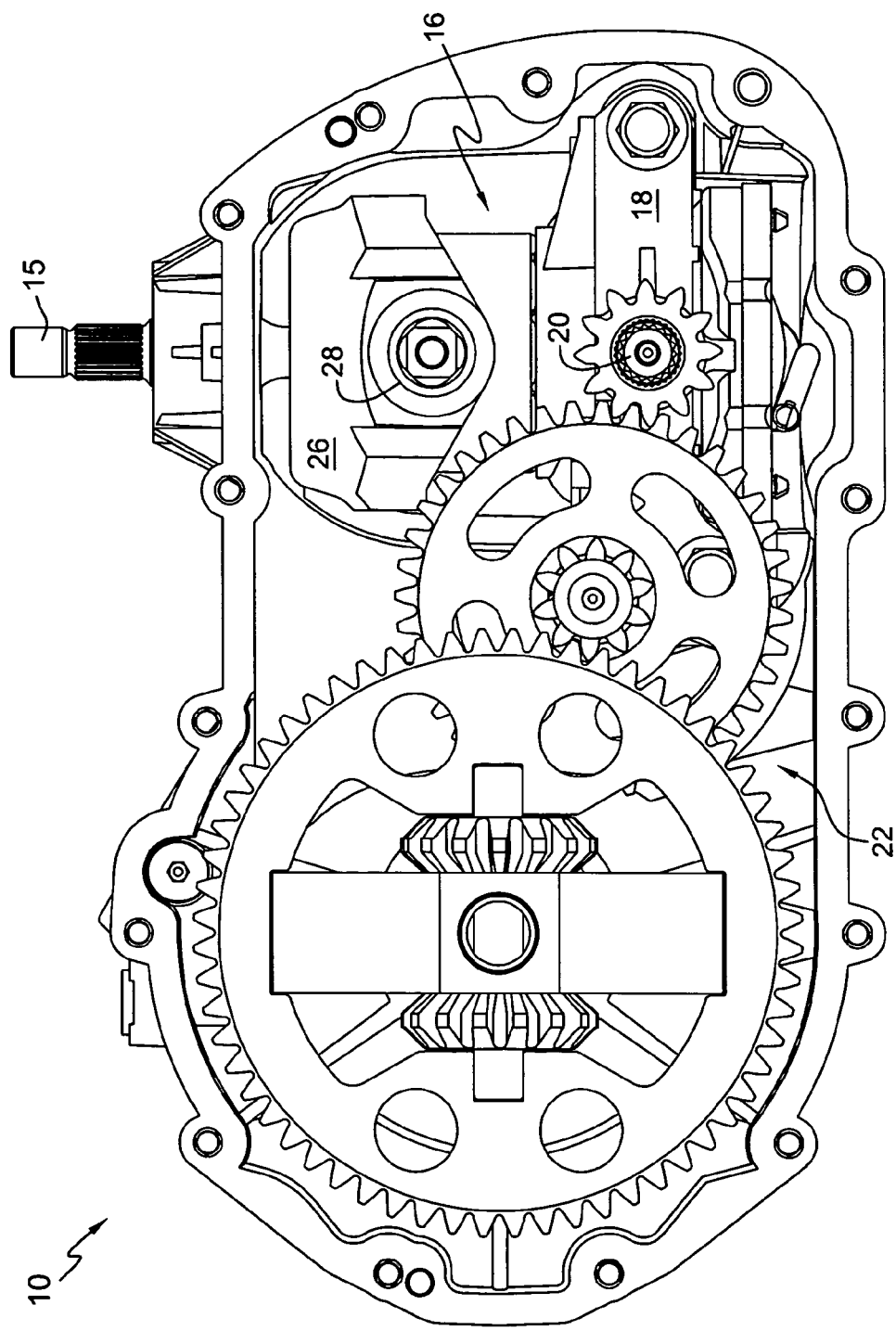
FIG. 3 depicts a side elevational view of the hydrostatic transaxle shown in FIG. 2 with the side housing removed.

Turning now to the figures, wherein like reference numerals refer to like elements, there is generally illustrated in FIGS. 1, 2, and 3 a hydrostatic transaxle 10 with a return-to-neutral mechanism 30. FIG. 1 shows a typical vehicle 12 in which transaxle 10 may be mounted. Also illustrated in FIGS. 7–16 is a hydraulic drive unit 40. The following description will use elements from each of these configurations to describe the general function of these devices and the various embodiments of the invention. Note that the figure item number for similar elements between embodiments generally have the same item number with a numerical prefix added. For example, the various stationary arms are labeled 54, 154, 254, etc.

Transaxles such as that shown in FIGS. 1, 2 and 3 generally operate on the principle of a prime mover 14 driving an input shaft 15. Input shaft 15 then drives a hydraulic pump 16, which then pushes oil through porting formed in center section 18 to a hydraulic motor (not shown) to cause rotation of a motor shaft 20. The rotation of motor shaft 20 may then be transferred through a gearing system 22, or the like, to drive one or more output shafts, which may also be axle shafts 24. For controlling the displacement of pump 16, which will be described in more detail later, a movable swash plate 26 is provided. The position of swash plate 26, which in these figures is of the type known as a trunnion mounted swash plate, is controlled by a trunnion 28 located between swash plate 26 and control arm 32. As shown in FIG. 1, to rotate control arm 32 and, accordingly, move swash plate 26, linkage 13 connects to a vehicle hand or foot control (not shown). To return control arm 32 to neutral under defined operation conditions, a return-to-neutral mechanism 30 may be coupled to control arm 32. Additional details regarding the operation of typical transaxles may be found in U.S. Pat. Nos. 5,314,387 and 6,122,996, which are both incorporated by reference herein.

Figure 7:
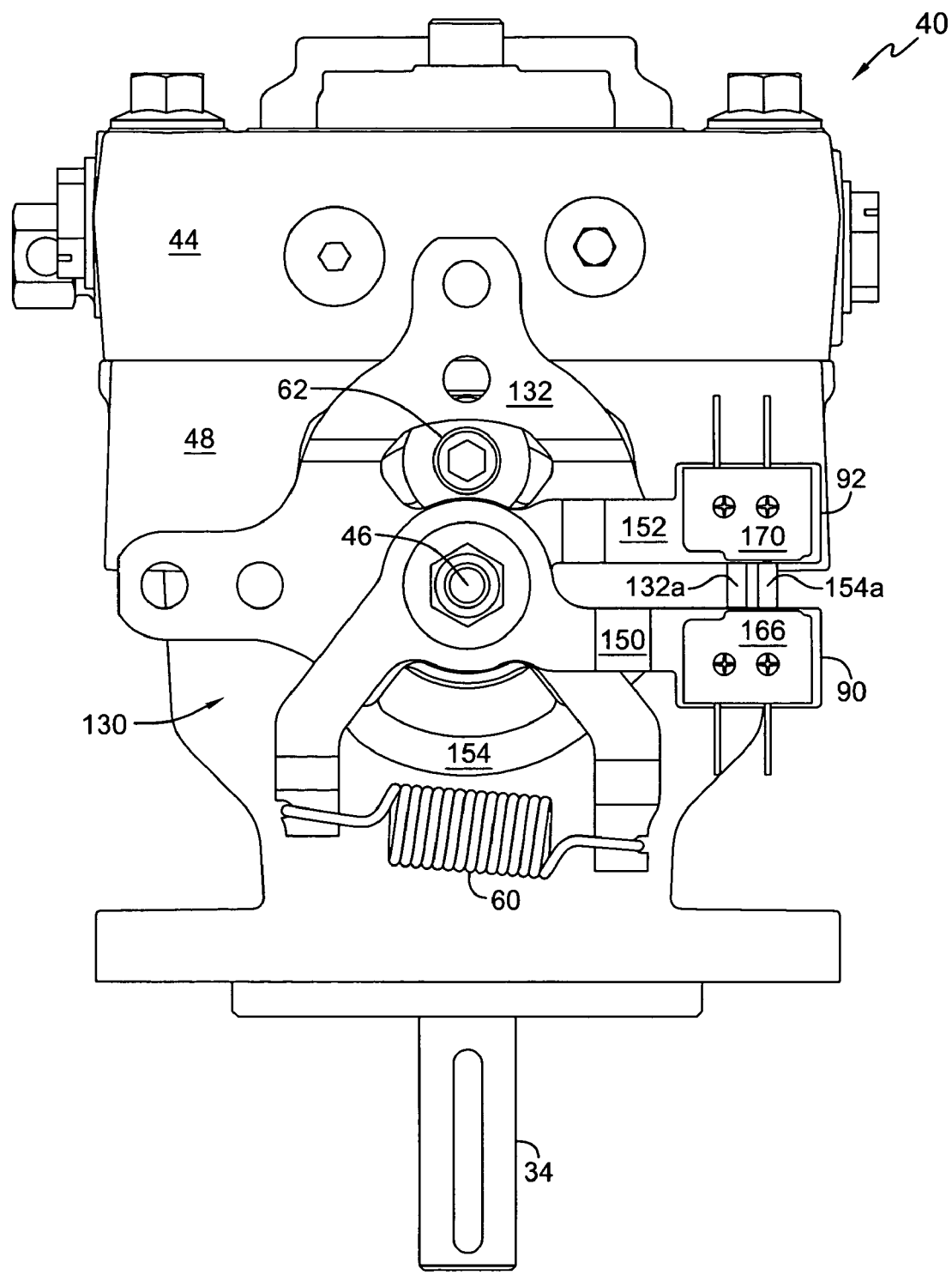
FIG. 7 depicts an elevational view of a second embodiment of the present invention in a neutral position incorporated in a hydraulic pump.
Figure 8:
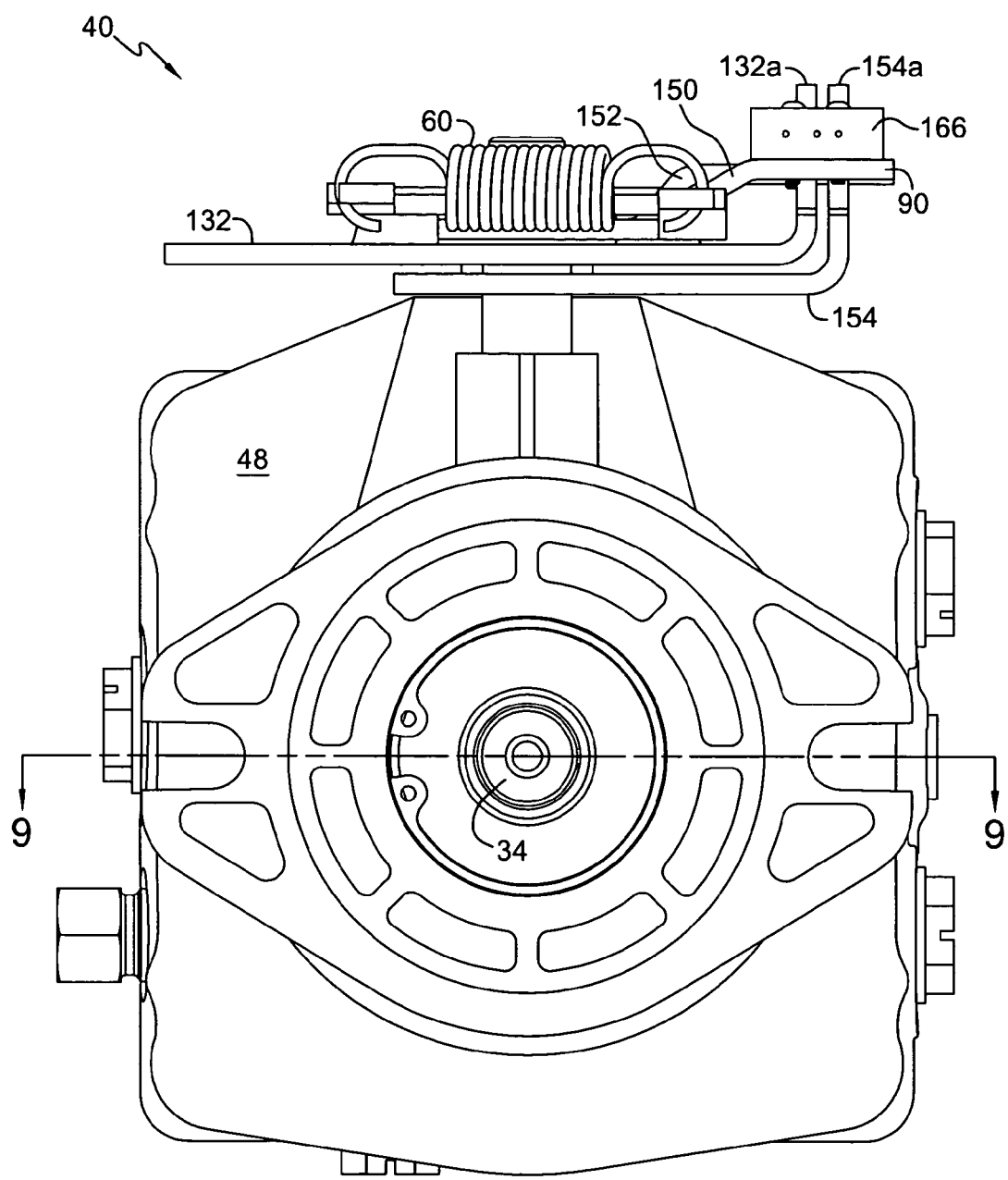
FIG. 8 depicts a bottom plan view of the embodiment shown in FIG. 7.
Figure 9:
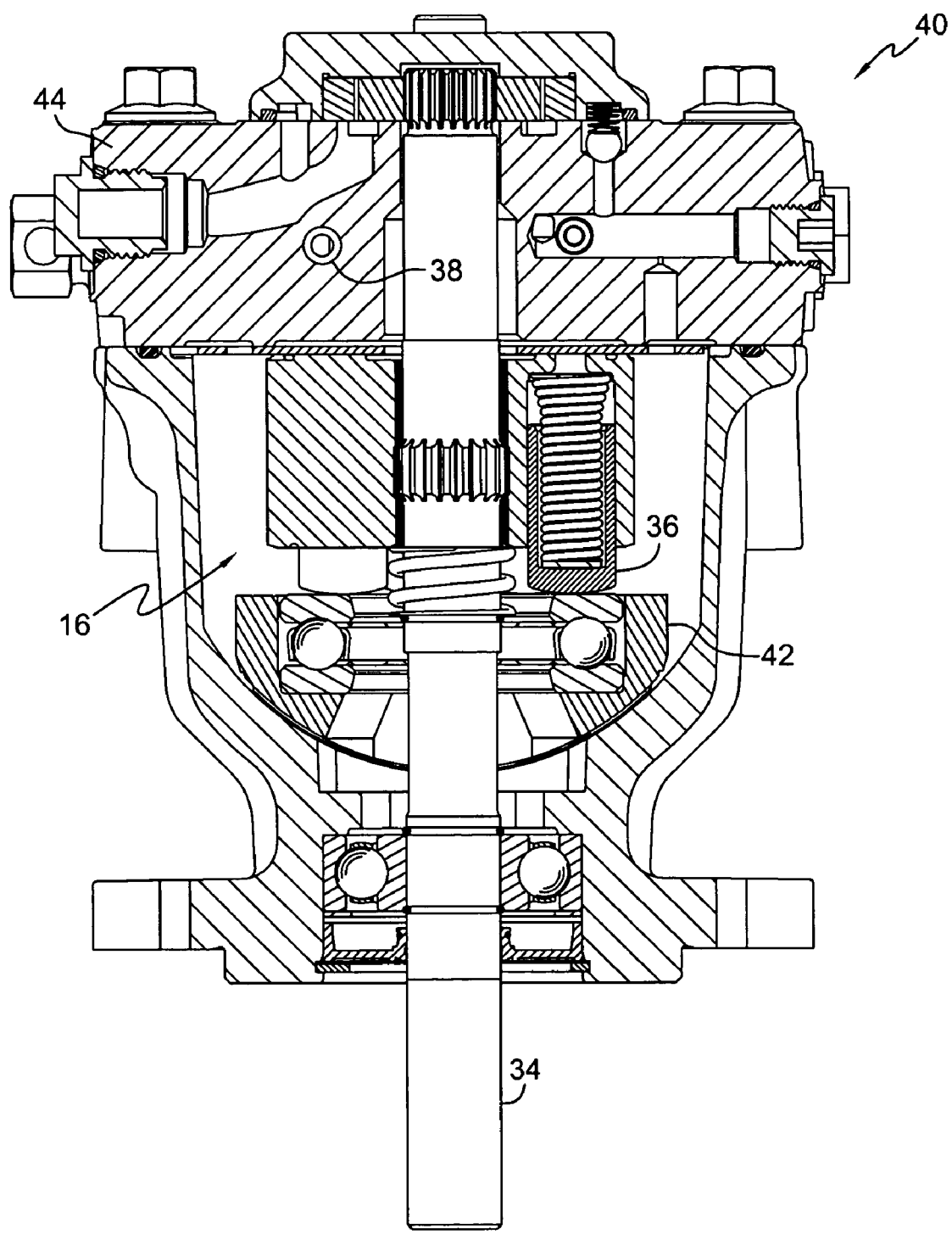
FIG. 9 depicts a sectional view of the embodiment shown in FIG. 8 taken along lines 9—9.

Similar to transaxle 10, hydraulic drive units also generally operate on the principle of a prime mover driving an input shaft. One type of hydraulic drive unit 40 in the form of a stand-alone hydraulic pump is shown in FIGS. 7, 8, and 9, wherein a prime mover (not shown) drives an input shaft 34. Input shaft 34 then drives a hydraulic pump 16, which through the action of pistons 36 pushes oil through porting 38 to a hydraulic motor to cause rotation of a motor shaft (not shown). Additional details regarding hydraulic drive devices as described herein may be found in U.S. Pat. No. 6,332,393, incorporated by reference herein. For adjusting the amount of oil that is pushed from hydraulic pump 16 to a hydraulic motor, hydraulic drive unit 40 includes a moveable swash plate 42 containing a bearing against which pump pistons 36 travel. As will be understood by those of ordinary skill in the art, swash plate 42 may be moved to a variety of positions to vary the stroke of pump pistons 36 and the direction of rotation of a hydraulic motor. As the stroke of pump pistons 36 is varied, the volume of the hydraulic fluid pumped into porting 38 of end cap 44 will vary. Since the speed of rotation of the hydraulic motor is dependent upon the amount of hydraulic fluid pumped into the hydraulic motor by hydraulic pump 16 and since the direction of rotation of the hydraulic motor is dependent upon the direction of rotation of swash plate 42, the positioning of swash plate 42 is seen to control the speed and direction of rotation of the hydraulic motor and, accordingly, the speed and direction of rotation of the motor output shaft.

For moving swash plate 42, swash plate 42 may be connected to a moveable trunnion arm 46, functionally similar to trunnion 28 shown in FIG. 3, which is rotatably mounted in casing 48 of hydraulic drive unit 40. As previously noted, trunnion arm 46 is also connected to a moveable control arm 32. Thus, the rotation of control arm 32 changes the angular orientation of trunnion arm 46 and swash plate 42 with respect to pump pistons 36.

Figure 4:
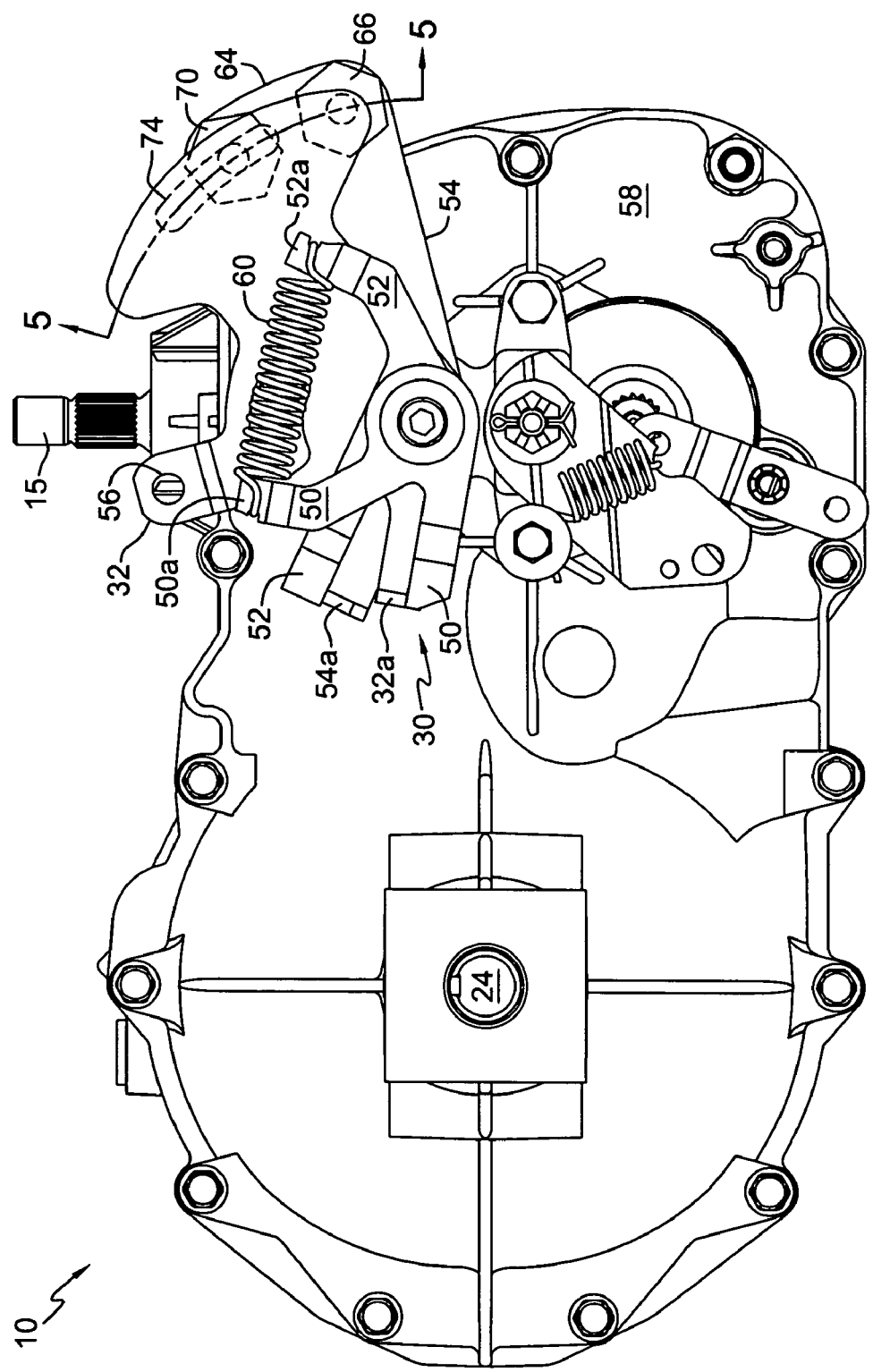
FIG. 4 depicts a side elevational view of the hydrostatic transaxle shown in FIG. 2 with the control arm stroked in the reverse direction.

For use in rotating control arm 32, the return-to-neutral mechanism is comprised of an outer scissor arm 50, an inner scissor arm 52 and a stationary arm 54. For example, FIGS. 2 and 4 shows a first embodiment of the invention associated with a uni-directional return-to-neutral mechanism 30. The uni-directional return-to-neutral mechanism 30 shown in FIGS. 2 and 4 is described in more detail in U.S. Pat. No. 6,782,797, which is commonly owned by the owner of this invention and incorporated by reference herein. In addition, a simplified return-to-neutral mechanism has been disclosed in U.S. Pat. No. 6,487,857 ("the '857 patent"), which is also commonly owned and incorporated by reference herein. The return-to-neutral disclosed in the '857 patent presents a compact design suitable for high volume assembly and automated adjustment. It should be understood by those with skill in the art that the present invention may be used in connection with a variety of control arm and return-to-neutral mechanisms.

During initial assembly, stationary arm 54 is locked into a position to establish a neutral position for return-to-neutral mechanism 30 and thus for hydraulic pump 16. The neutral position is the position of trunnion arm 28 where the flow of hydraulic fluid from hydraulic pump 16 to a hydraulic motor is insufficient to cause rotation of an associated output shaft. More generally, while the neutral position would typically be adjusted for a minimal output from hydraulic pump 16, a set point at any position in the range of movement for swash plate 26 may be selected.

To provide for rotation of trunnion arm 28, control arm 32 is non-rotatably mounted to the end of trunnion arm 28. The non-rotatable mating of control arm 32 to trunnion arm 28 is preferably accomplished by providing control arm 32 and trunnion arm 28 with complimentary mating shapes. In this manner, rotation of control arm 32 will also result in rotation of trunnion arm 28. For moving control arm 32 and, accordingly, trunnion arm 28 and swash plate 26 assembly to control the speed and direction of rotation of motor shaft 20, control arm 32 may also include openings 56 to which linkages associated with hand, foot, electronic or hydraulic controls may be attached, such as linkage 13 shown in FIG. 1.

During assembly, control arm 32 is mounted with stationary arm 54 positioned between control arm 32 and casing 58 of hydrostatic transaxle 10. The inner scissor arm 52 and outer scissor arm 50 are rotatably attached to trunnion arm 28 adjacent to control arm 32. A biasing means 60, such as a spring, is linked to inner and outer scissor arms 52 and 50, and more particularly, to arms 52a and 50a of inner and outer scissor arms 52 and 50, respectively. Once these components are mounted, control arm 32 is moved until trunnion arm 28 places swash plate 26 in a neutral position.

When control arm 32 is placed in a neutral position, stationary arm 54 is fixed to casing 58 of hydrostatic transaxle 10 by means of fastener 62 to lock stationary arm 54 in position. Under the influence of biasing means 60, projection 32a of control arm 32 and projection 54a of stationary arm 54 will be in alignment. This alignment of projections 32a and 54a establishes the neutral position. In the neutral position, both inner scissor arm 52 and outer scissor arm 50 are in contact with projection 32a of control arm 32, as illustrated in FIG. 2.

When control arm 32 is rotated under the influence of linkage 13 into a first direction from neutral that may equate to a motor shaft 20 or axle shaft 24 reverse direction, projection 32a of control arm 32 will contact outer scissor arm 50. As a result of this contact, movement of control arm 32 will also result in the movement of outer scissor arm 50. Meanwhile, inner scissor arm 52 is prevented from moving as it remains in contact with projection 54a of stationary arm 54, as shown in FIG. 4.

Once the influence of linkage 13 is removed from control arm 32, biasing means 60 will cause outer scissor arm 50 to move toward inner scissor arm 52. During this movement of outer scissor arm 50, outer scissor arm 50 will contact and move control arm 32 towards inner scissor arm 52 and projection 54a of stationary arm 54. The movement of outer scissor arm 50 and control arm 32 by biasing means 60 will continue until projection 32a of control arm 32 aligns with projection 54a of stationary arm 54 and both inner and outer scissor arms 52 and 50 contact projection 32a of control arm 32. Therefore, under the influence of biasing means 60, control arm 32 is returned to the neutral position illustrated in FIG. 2. Therefore, return-to-neutral mechanism 30 functions to substantially establish the neutral position of control arm 32 and to bias and return control arm 32 to the neutral position once the influence of a driving link is removed.

It should be appreciated that there are a variety of configurations available for mounting control arm 32 to the described devices. One common configuration is to mount a control arm on hydrostatic transaxle 10, and to have all other associated features, such as a return-to-neutral mechanism or forward or reverse stops, mounted on linkage attached to control arm 32. Another common configuration is to mount a control arm and return-to-neutral mechanism directly to hydrostatic transaxle 10, as shown in FIG. 2.

In the configuration shown in FIG. 2, as control arm 32 rotates in a second direction from neutral that is opposite the first direction, which shall be defined as the forward direction for this description, scissor arm 50 and scissor arm 52 will simultaneously rotate with control arm 32. Therefore, biasing means 60 does not influence scissor arm 50 or scissor arm 52 and this return-to-neutral mechanism 30 design is unidirectional.

Figure 5:
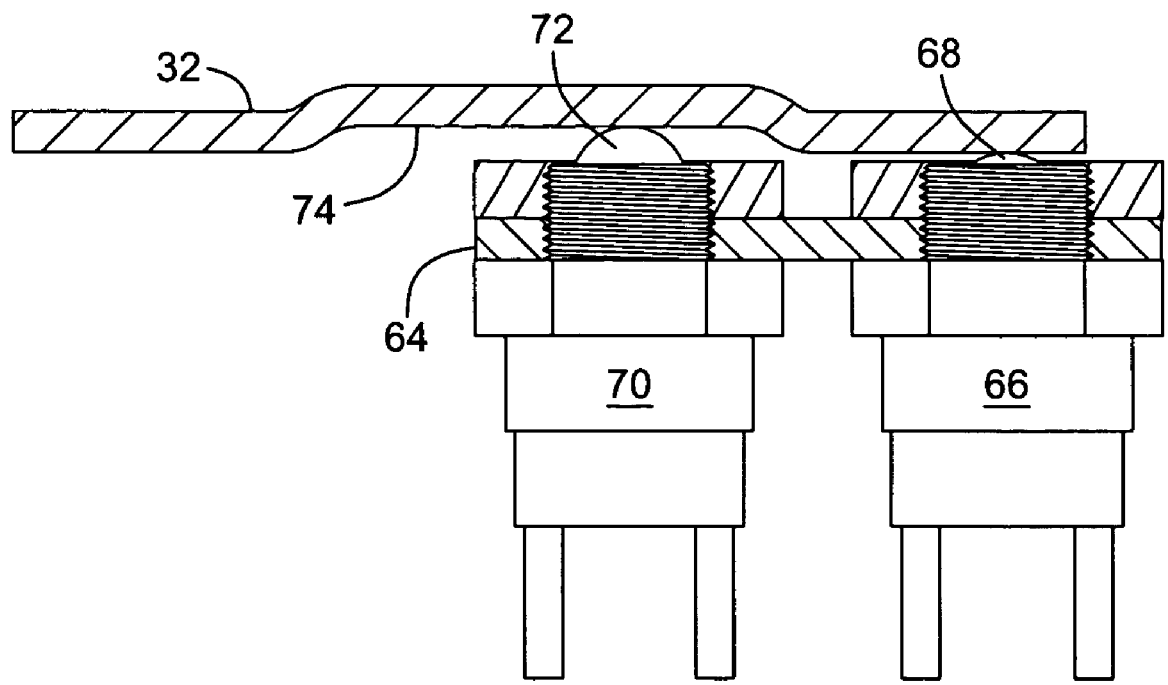
FIG. 5 depicts a partial sectional view of the embodiment shown in FIG. 4 along lines 5—5.

For indicating that return-to-neutral mechanism 30 is in a neutral position, switches 66 and 70 may be attached to a portion 64 of stationary arm 54. FIG. 5 shows the interface of switches 66 and 70 with control arm 32. Switches 66 and 70 are electrically closed when contacts 68 and 72 are in slot 74 of control arm 32. This closed position indicates that return-to-neutral mechanism 30 is in the neutral position. Slot 74 may be sized to accommodate expected variations in tolerance. As shown in FIGS. 4 and 5, when either switch 66 or switch 70 has moved from contact with slot 74 of control arm 32, the corresponding switch becomes electrically open. Therefore, the open position of either switch indicates that the return-to-neutral mechanism is not in a neutral position.

Figure 6:
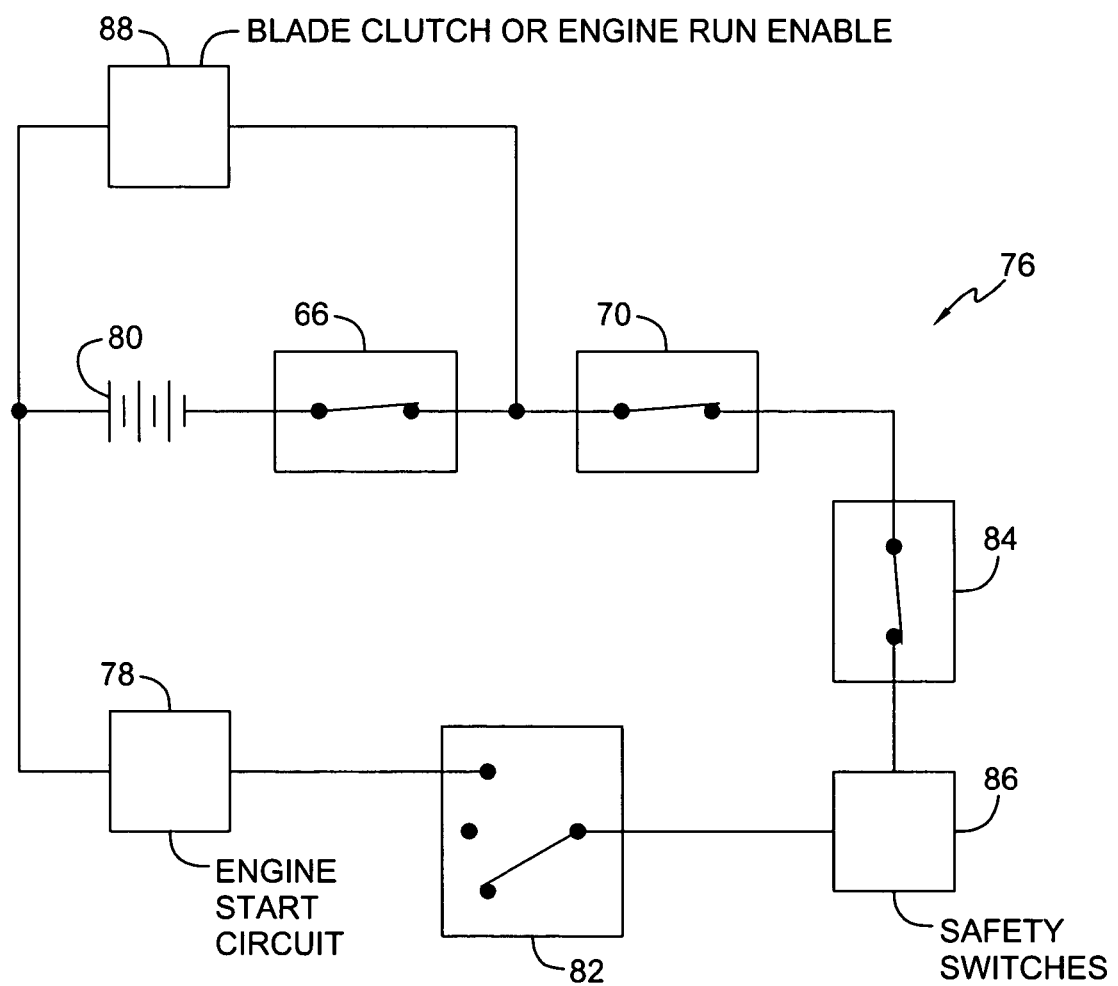
FIG. 6 depicts a simplified schematic of a system utilizing a neutral start switch.

FIG. 6 shows a simplified schematic of a portion of vehicle circuitry 76, which exemplifies the electrical functionality of neutral switches 66 and 70. For supplying power to engine start circuit 78, battery 80 is connected to neutral switch 66, which is further connected to neutral switch 70. When control arm 32 for the drive device is in the neutral position, switches 66 and 70 will be in the closed position. If control arm 32 is in the neutral position, the voltage signal is routed through neutral switches 66 and 70 and then through ignition switch 82 or a comparable component, thereby allowing the vehicle user to activate the engine. If neutral switches 66 and 70 are closed, indicating that the conditions monitored by each of the respective switches are in the desired state, then the vehicle user will be able to activate or start the engine or other prime mover. It should also be understood that additional switches may be included as part of vehicle circuitry 76.

For example, for requiring the vehicle brake to be activated prior to enabling the engine to be started, the voltage signal may also be routed through a brake switch 84 that is only closed when the brake is activated. To provide other safety functions with respect to starting the vehicle engine, other safety related switches 86 may also be included in vehicle circuitry 76, including, but not limited to, a seat switch to detect operator presence and a blade switch to determine whether the mower blades are in the activated position.

The schematic shown in FIG. 6 also allows vehicle circuitry 76 to achieve a mower blade cutoff function. More specifically, by providing a connection after the first switch, which for this example is switch 66, and connecting that switch to a mower blade clutch or engine run enable circuit 88, a mower blade cutoff function may be accomplished. Thus, switch 66 may function to disable a mower blade clutch to turn the mower blades off, or in another vehicle configuration, to turn the vehicle engine off. Since switch 66 is associated with the reverse direction for the present example, when the mower blades are activated and the drive device is driven in reverse, the mower blades will be stopped or the engine will be turned off, preventing mower blade operation in the reverse direction.

FIGS. 7 and 8 show a second embodiment of the present invention mounted on hydraulic drive unit 40. When return-to-neutral mechanism 130 is in the neutral position, normal open switches 166 and 170, mounted on portions 90 and 92 of scissor arms 150 and 152, respectively, contact projection 154a, thereby closing both switches and indicating that drive device 40 is in the neutral position. When control arm 132 is moved from the neutral position either switch 166 or switch 170 will move from contact with projection 154a, and the respective switch will then open, thereby indicating that return-to-neutral 130 and drive device 40 are not in the neutral position, and disabling engine start circuit 78. It should also be understood that switches 166 and 170 may be configured to become closed in response to contacting protrusion 132a or both protrusions 132a and 154a without departing from the functionality currently provided by the second embodiment of the present invention.

FIGS. 10 and 11 show a third embodiment of the present invention wherein contacts 68 and 72 of normally closed switches 66 and 70, which are mounted on stationary arm 254, are positioned adjacent to edges 232b of control arm 232. As control arm 232 is rotated from the neutral position, an edge 232a or 232b will depress either contact 68 of switch 66 or contact 72 of switch 70, respectively, and one of the two normally closed switches 66 and 70 will open, indicating drive device 40 is not in the neutral position. This embodiment also shows that the two switches design may be used on a drive device without the use of a return-to-neutral mechanism.

Figures 12, 13:
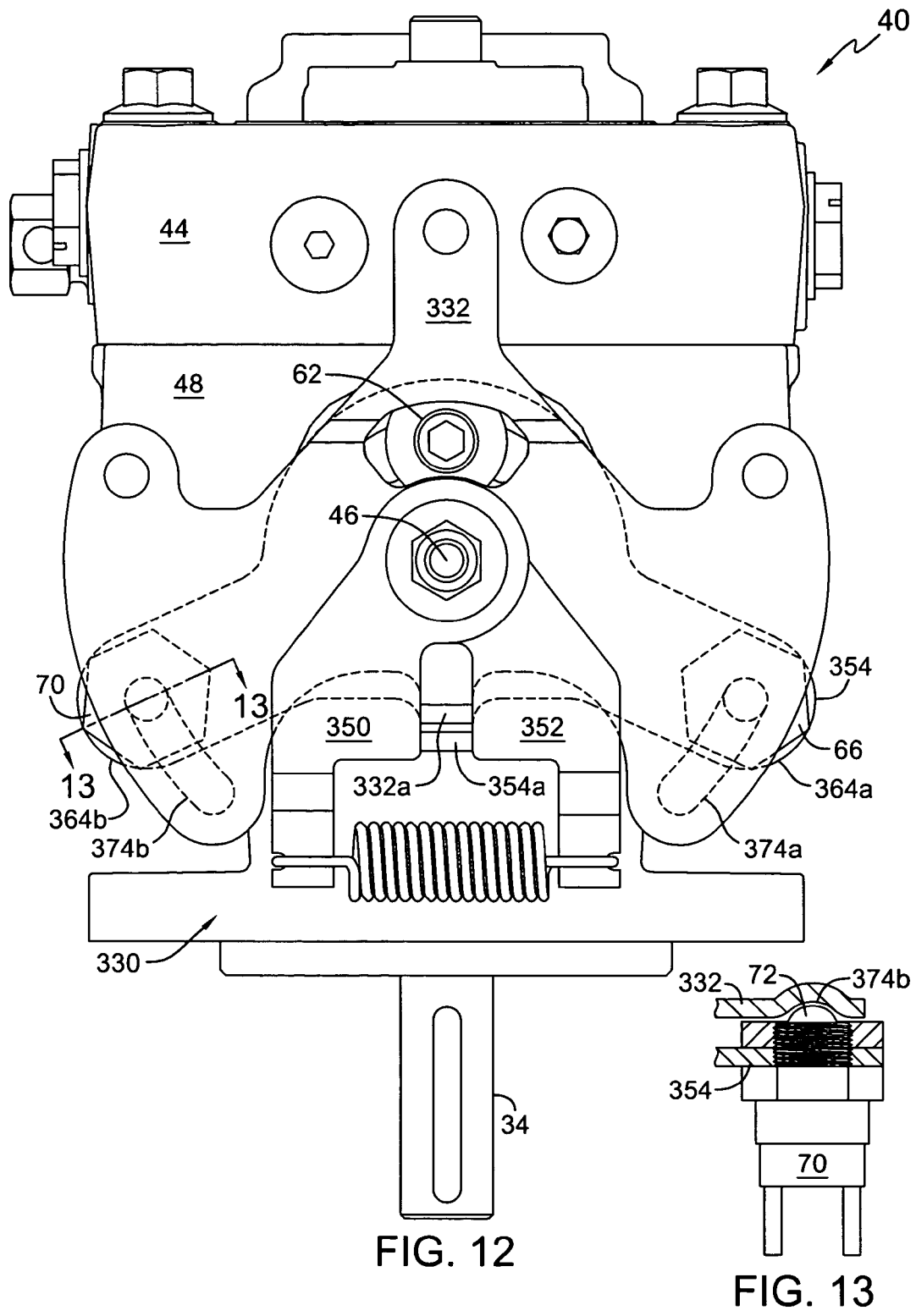
FIG. 12 depicts an elevational view of a fourth embodiment of the present invention in a neutral position incorporated in a hydraulic pump.
FIG. 13 depicts a partial sectional view of the embodiment shown in FIG. 12 along lines 13—13.

FIGS. 12 and 13 depict a fourth embodiment of the present invention where switches 66 and 70 are positioned on opposite sides of the trunnion 46. More specifically, normally closed switches 66 and 70 are mounted on separate projections 364a and 364b of stationary arm 354 where each projection 364a and 364b are formed on opposite sides of return-to-neutral mechanism 330. Switch 66 and switch 70 each interface with a groove 374a and 374b, respectively, formed into control arm 332. As the control arm is moved from the neutral position, either contact 68 of switch 66 or contact 72 of switch 70 will be depressed as contact 68 or 72 moves from slot 374a or 374b, thus opening switch 66 or 70 and indicating that return-to-neutral mechanism 330 and drive device 40 are not in the neutral position.

Figure 14:
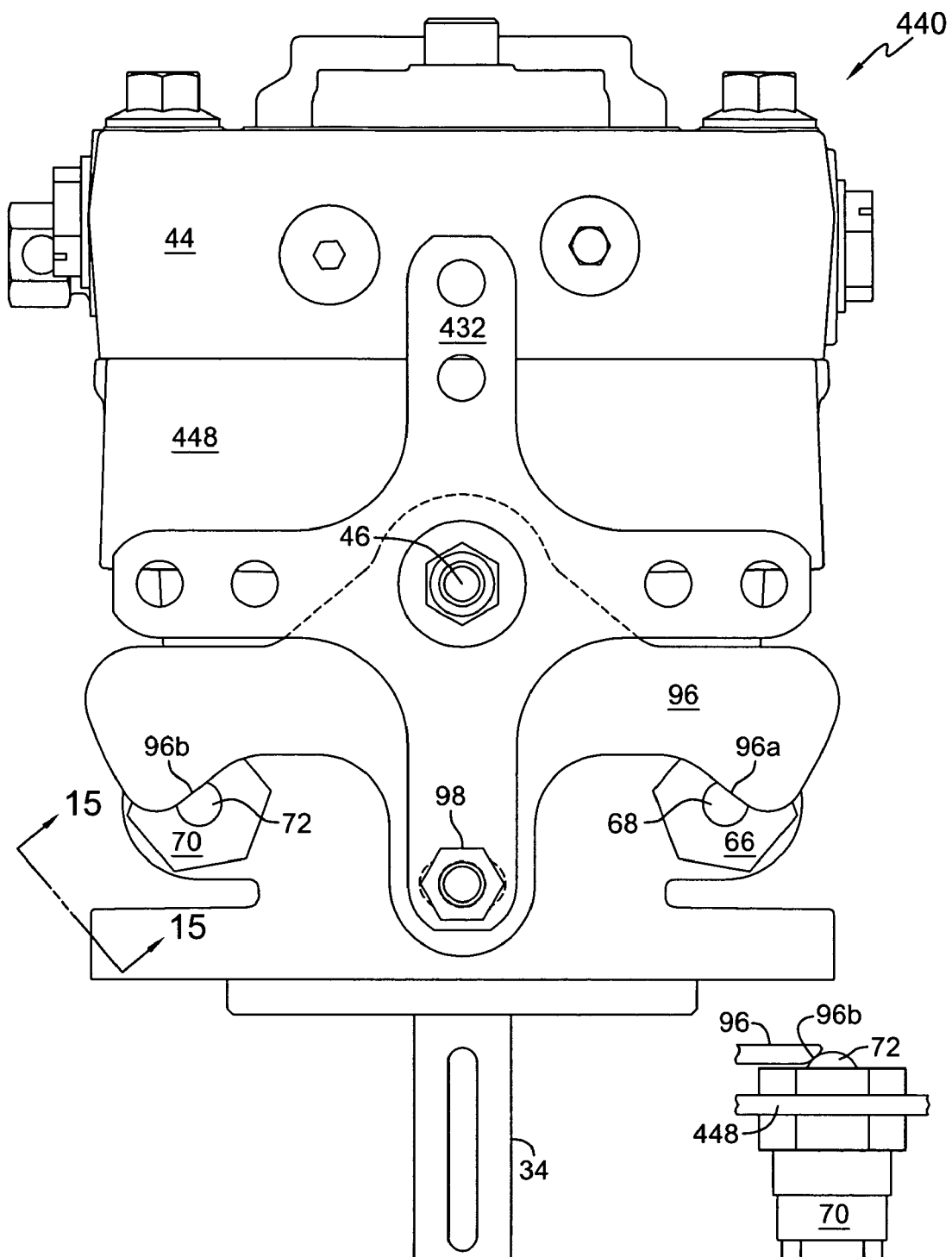
FIG. 14 depicts an elevational view of a fifth embodiment of the present invention in a neutral position incorporated in a hydraulic pump.
Figure 15:
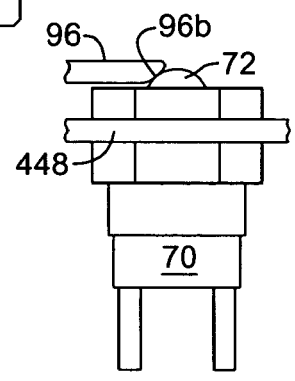
FIG. 15 depicts a partial view of the embodiment shown in FIG. 14 along lines 15—15.

FIGS. 14 and 15 depict a fifth embodiment of the present invention where switches 66 and 70 are positioned on opposite sides of the trunnion 46. More specifically, normally closed switches 66 and 70 are mounted in casing 448 of drive device 440. In this embodiment a switch actuator arm 96 is located on trunnion 46 adjacent to control arm 432. During assembly, control arm 432 is initially positioned at neutral. Switch actuator arm 96 is then rotated such that neither switch 66 nor switch 70 is actuated. Once this position is established, arm 96 is locked to control arm 432 by means of fastener 98. In this manner the switch actuating arm can be adjusted to accommodate variations in tolerance such that actuations of switches 66 and 70 more precisely match the position of control arm 432. FIG. 15 shows that switch 70 is actuated by edge 96b of switch actuator arm 96. Edge 96a and switch 66 interact similar to the interaction of edge 96b and switch 70. Such actuation may also be by a variety of others means, such as slots, depressions, or raised areas on arm 96.

Figure 16:
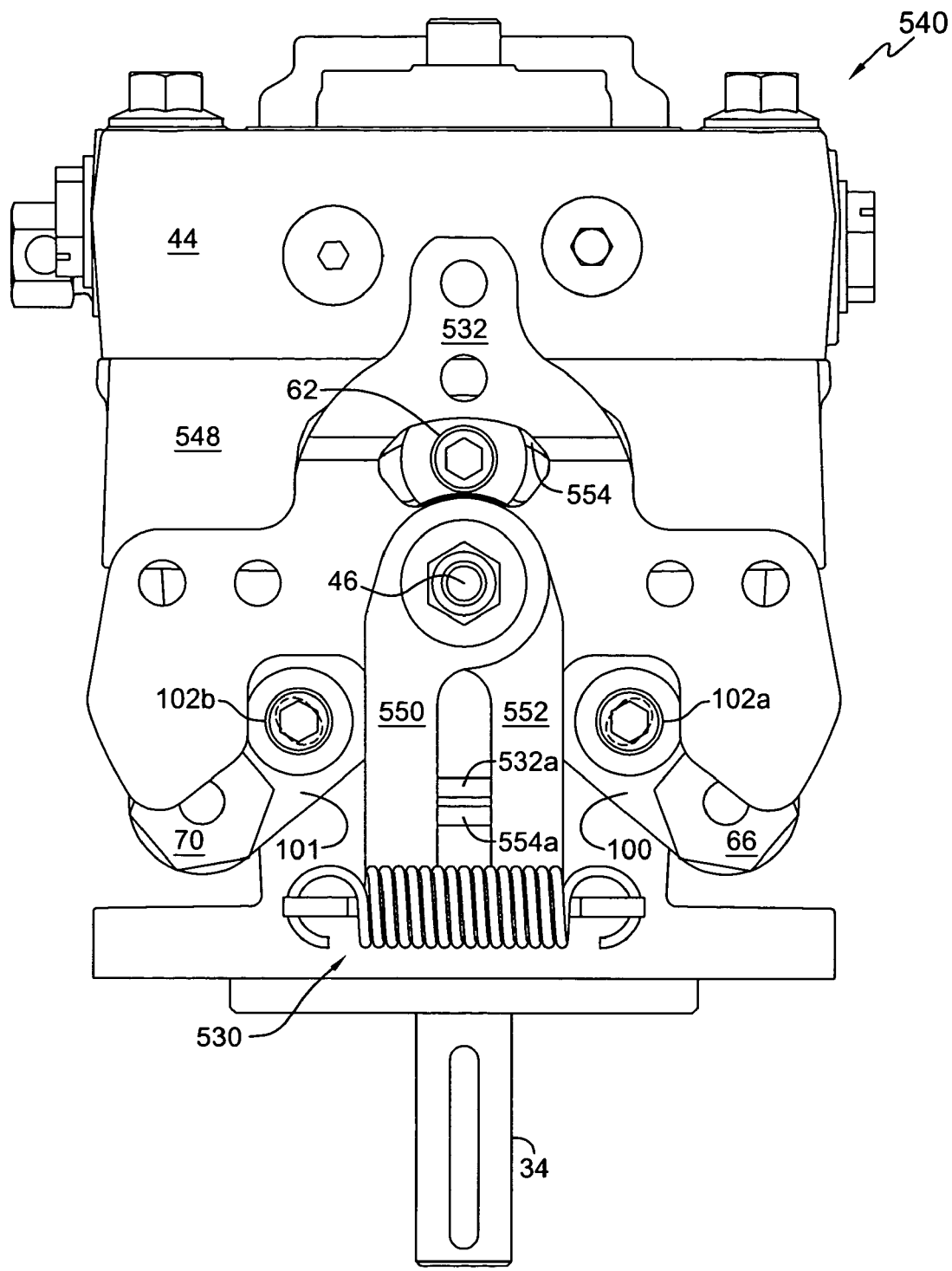
FIG. 16 depicts an elevational view of a sixth embodiment of the present invention in a neutral position incorporated in a hydraulic pump.

FIG. 16 depicts a sixth embodiment of the present invention. Each switch 66 and 70 is mounted on an adjustment arm 100 and 101, respectively. This embodiment uses a return-to-neutral mechanism 530 similar to those previously shown in FIGS. 2, 4, 7, 8 and 12. It should be appreciated by those with skill in the art that although the configuration of outer scissor arm 550 and inner scissor arm 552 is slightly different from the previous configurations, it functions in a similar fashion. As in the previous embodiments, stationary arm 554 is located on trunnion arm 46. In this embodiment, adjustment arms 100 and 101 are rotatably mounted on trunnion arm 46 adjacent to stationary arm 554 and in a manner similar to stationary arm 554 being mounted to trunnion arm 46. Lastly, control arm 532, outer scissor arm 550 and inner scissor arm 552 are mounted to the end of trunnion arm 46 and secured in position by a fastener.

For example, during assembly, stationary arm 554 is positioned to locate control arm 532 in neutral. Stationary arm 554 is then locked into position by tightening fastener 62 into casing 548. Next, adjustment arm 100, on which switch 66 is mounted, is positioned such that rotation of control arm 532 in the clockwise direction would cause immediate actuation of switch 66. Once in position, adjustment arm 100 is locked into position by tightening fastener 102a into casing 548. It should be understood that adjustment arm 100 and adjustment arm 101 are independently and rotatably mounted to trunnion arm 46. Adjustment arm 101, on which switch 70 is mounted, is then positioned such that counterclockwise rotation of control arm 532 would cause immediate actuation of switch 70. Once in position, adjustment arm 101 is locked into position by tightening fastener 102b into casing 548. The advantage of this embodiment is that the actuation point of each switch may be more precisely adjusted, eliminating the need to accommodate various tolerances that occur during fabrication.

While the discussion herein provides specific nomenclature for the switches described, i.e., normally open or normally closed, a person of ordinary skill in the art would recognize that circuit 76 is but one of numerous configurations possible to accomplish the functions described. Thus, the descriptions "normally open" or "normally closed" should be held as being illustrative only and not limiting.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A hydraulic drive device capable of driving in a forward and a reverse direction, comprising:
    a casing;
    a hydraulic pump located within the casing;
    a control arm coupled to the hydraulic pump to control the hydraulic pump fluid flow, the control arm having a first position corresponding to the hydraulic drive device driving in a forward direction and a second position;
    a first switch mounted at a first location on the hydraulic drive device, the first switch cooperating with the control arm and having an open state and a closed state, wherein the first switch being in the open state is indicative of the control arm assuming the first position; and
    a second switch mounted at a second location on the hydraulic drive device separate from the first location, the second switch cooperating with the control arm and having an open state and a closed state, wherein the state of the second switch is indicative of the control arm assuming the second position.

2. The hydraulic drive device of claim 1, wherein the second position of the control arm corresponds to the hydraulic drive device driving in the reverse direction.

3. The hydraulic drive device of claim 2, wherein the second switch being in the open state is indicative of the control arm being in the second position.

4. The hydraulic drive device of claim 1, wherein the first switch is mechanically actuated.

5. The hydraulic drive device of claim 1, wherein the second switch is mechanically actuated.

6. The hydraulic drive device of claim 1, wherein the positions of the first switch and the second switch with respect to the control arm are independently adjustable.

7. A hydraulic drive device capable of driving in a forward and a reverse direction, comprising:
    a casing;
    a hydraulic pump located within the casing;
    a control arm coupled to the hydraulic pump to control the hydraulic pump fluid flow;
    a first switch cooperating with the control arm, wherein the state of the first switch is indicative of the control arm assuming a first position;
    a second switch cooperating with the control arm, wherein the state of the second switch is indicative of the control arm assuming a second position; and
    a return-to-neutral mechanism coupled to the control arm, the return-to-neutral mechanism also including a stationary arm.

8. The hydraulic drive device of claim 7, wherein the first switch is attached to the stationary arm.

9. The hydraulic drive device of claim 8, wherein the second switch is attached to the stationary arm.

10. The hydraulic drive device of claim 7, wherein the position of the stationary arm establishes the neutral position of the hydraulic drive device.

11. A hydraulic drive device capable of driving in a forward and a reverse direction, comprising:
    a casing;
    a hydraulic pump located within the casing;
    a control arm coupled to the hydraulic pump to control the hydraulic pump fluid flow;
    a first switch cooperating with the control arm and having an open state and a closed state, wherein the state of the first switch is indicative of the control arm assuming a first position; and
    a second switch cooperating with the control arm and having an open state and a closed state, wherein the state of the second switch is indicative of the control arm assuming a second position,
    wherein the positions of the first switch and the second switch with respect to the control arm are jointly adjustable.

12. A hydraulic drive device capable of driving in a forward and a reverse direction comprising:
    a casing;
    a hydraulic pump located within the casing;
    a control arm coupled to the hydraulic pump to control the hydraulic pump fluid flow, the control arm having a first position corresponding to the hydraulic drive device driving in a forward direction and a second position;
    a first switch mounted at a first location on the hydraulic drive device, the first switch cooperating with the control arm and having an open state and a closed state, wherein the first switch being in the open state is indicative of the control arm assuming the first position;
    a second switch mounted at a second location on the hydraulic drive device separate from the first location, the second switch cooperating with the control arm and having an open state and a closed state, wherein the state of the second switch is indicative of the control arm assuming the second position;
    a prime mover drivingly connected to the hydraulic pump; and
    an ignition electrically coupled to the prime mover and the first switch and the second switch.

13. The hydraulic drive device of claim 12, wherein the control arm being in a neutral position places the first switch and the second switch in the closed state and enables the ignition.

14. The hydraulic drive device of claim 12, wherein the control arm being in the first position places the first switch in the open state and disables the ignition.

15. The hydraulic drive device of claim 12, wherein the control arm being in the second position places the second switch in the open state and disables the ignition.

16. The hydraulic drive device of claim 12, wherein the hydraulic drive device further includes a mower blade.

17. The hydraulic drive device of claim 16, wherein the mower blade is electrically coupled to the second switch.

18. The hydraulic drive device of claim 17, wherein the control arm being in the second position places the second switch in the open state and disables the mower blade.

19. A hydraulic drive device capable of driving in a forward and a reverse direction comprising:
   a variable displacement hydraulic pump;
   a control arm coupled to the hydraulic pump for controlling pump displacement;
   a first switch cooperating with the control arm, the first switch providing a first signal when the control arm assumes a first position;
   a second switch cooperating with the control arm, the second switch providing a second signal when the control arm assumes a second position, wherein the first switch and second switch are mounted in separate locations on the hydraulic drive device;
   a prime mover drivingly coupled to the hydraulic pump; and
   an ignition electrically coupled to the prime mover, the first switch and the second switch.

20. The hydraulic drive device of claim 19, wherein the first position corresponds to the hydraulic drive device driving in a forward direction.

21. The hydraulic drive device of claim 19, wherein the second position corresponds to the hydraulic drive device driving in a reverse direction.

22. The hydraulic drive device of claim 21, wherein a mower blade is coupled to the hydraulic drive device.

23. The hydraulic drive device of claim 22, wherein the control arm being in the second position causes the second switch to provide the second signal to the mower blade, thereby causing the mower blade to be disabled.

24. The hydraulic drive device of claim 19, wherein the control arm being in the neutral position places the first switch and second switch in a closed state and enables the ignition switch to actuate the prime mover.

25. The hydraulic drive device of claim 19, wherein the positions of the first switch and the second switch with respect to the control arm are independently adjustable.

26. A hydraulic drive device attached to a vehicle having a prime mover, which is drivingly coupled to the hydraulic drive device, the hydraulic drive device comprising:
   a housing;
   a hydraulic pump positioned within the housing;
   a control arm coupled to the hydraulic pump for controlling the hydraulic pump output;
   an ignition switch electrically coupled to the prime mover; and
   a pair of neutral switches cooperating with the control arm and electrically connected to the ignition switch, each of the neutral switches having an open position where the ignition switch is disabled and a closed position where the ignition switch is enabled, wherein both of the neutral switches will assume the closed position when the control arm is in a predefined position.

27. The hydraulic drive device of claim 26, wherein the predefined position is a neutral position.

28. A hydrostatic transaxle drivingly coupled to a prime mover, where the prime mover is electronically coupled to an ignition switch, the hydrostatic transaxle including a casing, a hydraulic pump mounted within the casing and in fluid communication with a hydraulic motor, a moveable swash plate cooperable with the hydraulic pump for controlling the speed and direction of rotation of the hydraulic motor, and a control arm coupled to the moveable swash plate for adjusting the orientation of the swash plate, wherein the improvement comprises:
   a return-to-neutral mechanism drivingly coupled to the control arm for returning the control arm to a neutral position, the return-to-neural mechanism further comprising a stationary arm, an inner scissor return arm, an outer second scissor return arm, and a biasing device for rotating the control arm to a neutral position; and
   a pair of neutral switches cooperating with the control arm and electrically connected to the ignition switch, each of the neutral switches having an open position where the ignition switch is disabled and a closed position where the neutral switch is enabled, wherein both of the neutral switches assume the closed position when the control arm is in a predefined position.

29. The hydraulic drive device of claim 28, wherein the predefined position is a neutral position.

30. A hydraulic drive device capable of driving in a forward and a reverse direction comprising:
   a variable displacement hydraulic pump;
   a control arm coupled to the hydraulic pump for controlling pump displacement;
   a first switch cooperating with the control arm, the first switch providing a first signal when the control arm assumes a first position; and
   a second switch cooperating with the control arm, the second switch providing a second signal when the control arm assumes a second position, wherein the first switch and second switch are mounted in separate locations on the hydraulic drive device and the positions of the first switch and the second switch with respect to the control arm are jointly adjustable.

* * * * *